US011901092B2

(12) United States Patent
Gohier

(10) Patent No.: US 11,901,092 B2
(45) Date of Patent: Feb. 13, 2024

(54) TIGHT DEVICE GIVING ACCESS TO AN ENCLOSURE, AS WELL AS A CORRESPONDING TIGHT CONNECTION SYSTEM BETWEEN TWO ENCLOSURES

(71) Applicant: JCE BIOTECHNOLOGY, Hauterive (FR)

(72) Inventor: Eric Gohier, Vichy (FR)

(73) Assignee: JCE BIOTECHNOLOGY, Hauterive (FR)

( * ) Notice: Subject to any disclaimer, the term of this patent is extended or adjusted under 35 U.S.C. 154(b) by 112 days.

(21) Appl. No.: 17/533,083

(22) Filed: Nov. 22, 2021

(65) Prior Publication Data

US 2022/0165443 A1 May 26, 2022

(30) Foreign Application Priority Data

Nov. 23, 2020 (FR) ...................................... 2012012

(51) Int. Cl.
*G21F 5/12* (2006.01)

(52) U.S. Cl.
CPC ...................................... *G21F 5/12* (2013.01)

(58) Field of Classification Search
CPC ........................................................ G21F 5/12
USPC ........................................................ 220/200
See application file for complete search history.

(56) References Cited

U.S. PATENT DOCUMENTS 10,377,537 B2 * 8/2019 Rigel ..................... B65D 47/32
11,324,196 B2 * 5/2022 Reinke ..................... A01K 7/06
2015/0217909 A1 * 8/2015 Garcia Cortes ...... B65D 47/043
222/511

FOREIGN PATENT DOCUMENTS

CN 112542258 A * 3/2021
DE 3214278 A * 2/1983 ............... G21F 5/12
EP 2091051 A1 8/2009
EP 2824671 A1 * 1/2015 ............... G21F 5/12
FR 2536048 A * 5/1984 ............... G21F 5/12
GB 2038921 A 7/1980
GB 2572894 A * 10/2019 ............. B65D 45/24

OTHER PUBLICATIONS

INPI Rapport de Recherche Préliminaire for Patent Application No. 2012012, Jul. 27, 2021, 2 pp.

* cited by examiner

*Primary Examiner* — J. Gregory Pickett
*Assistant Examiner* — Niki M Eloshway
(74) *Attorney, Agent, or Firm* — Soquel Group LLC

(57) ABSTRACT

A tight device including a flange joined to an enclosure to connect interior and exterior of the enclosure via a through opening of the flange, a door moving between closed and open configurations, and a joint integral with the flange and joining the through opening from the door in the closed configuration. To limit risk of pollution when transferring sterile material through the device, a tubular member is mounted on the flange to move between a retracted position, where the tubular member is arranged outside the through opening when the door is in the closed configuration, and a deployed position, where the tubular member is arranged in the through opening so as to cover the joint when the door is in the open configuration. An elastic member drives the tubular member from its retracted to its deployed position when the door is in the open configuration.

19 Claims, 6 Drawing Sheets

TIGHT DEVICE GIVING ACCESS TO AN ENCLOSURE, AS WELL AS A CORRESPONDING TIGHT CONNECTION SYSTEM BETWEEN TWO ENCLOSURES

CROSS-REFERENCE TO RELATED APPLICATIONS

This application claims priority of French Patent Application No. 20 12012, filed on Nov. 23, 2020.

FIELD OF THE INVENTION

The present invention relates to a tight device giving access to an enclosure. The invention also relates to a tight connection system between two enclosures, comprising such a tight device.

BACKGROUND OF THE INVENTION

The term "enclosure" is used here to refer to a recipient, in particular a container, or an isolator or a chamber or a location having an access that can be closed tight. This enclosure defines a volume for the preparation, storage and/or handling of products that must not be in contact with the outside, or with a user. These involve sterile products, for example, or even dangerous products such as certain biological or chemical products. Such an enclosure allows certain handling of these products without the handler being in direct contact with the products. The handling is carried out by means of tools or gloves, fixed on the enclosure if necessary. The handling of the products is thus carried out by isolating the interior of the enclosure from the outside.

For some handling, it is necessary to connect two enclosures tightly to each other. This connection is made while preserving the sterility and/or the confinement of the interior of the enclosures, without direct contact with the outside. One of the enclosures to be connected may be a product or material supply container, for example, or a waste collection container.

In order to access the interior of an enclosure, the enclosure is provided with a tight device comprising a flange that delimits a through opening connecting the interior and the exterior of the enclosure, and a door that is movable relative to the flange in order to close/unclose the through opening of the flange. The closure of this through opening is sealed by a gasket that is attached to the flange or the door. If two enclosures are to be connected, a connection must be made to prevent contamination from the outside. For this, it is known to connect the tight devices of the two enclosures tightly, these two devices commonly called "alpha part" and "beta part" in the field. Thus, for example, the sterility of a handling enclosure must be preserved when this handling enclosure is connected to a container for supplying the interior of the handling enclosure with products or materials or for evacuating certain waste materials from the handling enclosure. EP 2091051 discloses an example of such a tight connection system.

This being recalled, the invention is more specifically concerned with a problem associated with the gasket of tight devices giving access to an enclosure when this gasket is attached to the flange of the device, which is typically the case for the so-called "beta part" devices. Indeed, before connecting the "part beta" device to the "part alpha" device of another enclosure, the gasket of the "part beta" device is, in part, applied against the door of this device to seal the closing of the flange by this door, while the rest of the gasket is in contact with the air and thus potentially with particles present in this air: once the "part beta" device is connected to the "part alpha" device of the other enclosure, the particles present on the gasket are likely to be detached from it by being carried by sterile products or materials, transferred from the enclosure of the "part beta" device to the other enclosure. Moreover, also during such transfers of products or materials, the latter may damage the gasket of the "part beta" device by repeated friction, causing micro-fragments of the gasket. Thus, the gasket of the "beta part" device can be a source of pollution for the connection between two enclosures.

SUMMARY OF THE DESCRIPTION

The object of the present invention is to provide an improved tight device that limits the risk of pollution in the transfer of sterile products or materials through this device.

To this end, an object of the invention is a tight device giving access to an enclosure, the tight device comprising:

- a flange, which delimits a through opening defining a central axis, and which is adapted to be attached tightly to the enclosure so as to connect interior and exterior of the enclosure via the through opening,
- a door that is movable relative to the flange between a closed configuration, in which the door closes the through opening, and an open configuration, in which the door is disengaged from the through opening,
- a gasket, which is attached to the flange and which seals closing of the through opening by the door, in the closed configuration.
- a tubular member, which is movably mounted on the flange between:
  - a retracted position, in which the tubular member is arranged outside the through opening, the retracted position being occupied by the tubular member when the door is in the closed configuration, and
  - a deployed position, in which the tubular member is arranged inside the through opening so as to cover the gasket, the deployed position being occupied by the tubular member when the door is in the open configuration, and
- an elastic member, which is adapted to drive the tubular member from its retracted position to the deployed position when the door is in an open configuration.

One of the ideas behind the invention is to equip the tight device, typically the aforementioned "part beta" device, with a tubular member designed to cover the gasket when the door is open and thus sterile products or materials are to be transferred through the through opening. To this end, the tubular member is deployed in the through opening of the flange when the door is open and this tubular member thus forms an equipment protection with respect to the gasket by being physically interposed between the gasket and the transferred products or materials, which prevents the latter from coming into contact with the gasket and thus causing potential particles that would be present on the gasket and/or deteriorating the gasket by friction. This tubular member is carried in a mobile manner by the flange, so that it can be retracted from the through opening when the door is closed. To effectively move from its retracted position to its deployed position, the tubular member is driven by an elastic member which is arranged to store elastic energy, by deformation, when the door is closed and to release this energy to driving the tubular member when the door is open. The tight device according to the invention thus makes it possible to solve the problem relating to its gasket astutely, as described above, by means of simple, effective arrangements without operating constraints for the user of the tight device.

According to additional advantageous features of the tight device according to the invention, taken in isolation or according to all technically possible combinations:

When the tubular member is in the deployed position, the gasket is arranged all around the tubular member and the tubular member extends lengthwise on both sides of the gasket.

The tubular member in the retracted position is pressed by the elastic member against the door in the closed configuration so as to be driven to the deployed position by the elastic member at the same time as the door is moved to the open configuration.

The tubular member is coaxial with the central axis.

The tubular member is movable between its retracted and deployed positions by translation along the central axis.

The tubular member is guided in translation by complementarity of shapes between its outer lateral surface and both the edge of the through opening and a dedicated bearing of the flange.

The elastic member comprises a helical spring, which is arranged around the tubular member and is interposed, along the central axis, between a collar of the tubular member and an edge of the flange.

The flange and the tubular member together define a housing, in which the elastic member is integrally arranged and which remains closed when the tubular member passes between its retracted and deployed positions.

The invention also has as another object a system for tightly connecting two enclosures. The system comprises:

a first tight device, giving access to a first enclosure of the two enclosures, the first tight device comprising a first flange, which delimits a through opening defining a central axis, and which is adapted to be attached tightly to the first enclosure so as to connect interior and exterior of the first enclosure via the through opening.

a first door that is movable relative to the first flange between a closed configuration, in which the first door closes the through opening, and an open configuration, in which the first door is disengaged from the through opening, a gasket, which is attached to the first flange and which seals closing of the through opening by the first door in the closed configuration.

a tubular member, which is movably mounted on the first flange between:

- a retracted position, in which the tubular member is arranged outside the through opening, the retracted position being occupied by the tubular member when the first door is in the closed configuration, and
- a deployed position, in which the tubular member is arranged inside the through opening so as to cover the gasket, the deployed position being occupied by the tubular member when the first door is in the open configuration, and an elastic member, which is adapted to drive the tubular member from its retracted position to the deployed position when the first door is in an open configuration.

The first flange and the first door are provided with first fastening means, adapted to fasten the first flange and the first door to each other in a reversible manner in the closed configuration.

The system further comprises a second tight device, giving access to a second of the two enclosures, the second tight device comprising a second flange, which is adapted to be attached tightly to the second enclosure so as to give access to the interior of the second enclosure through the second flange, and a second door, which is carried by the second flange in a movable manner, in particular in a tilting manner about a tilting axis orthoradial to a central axis of the second flange, between a closed position, in which the second door seals the second flange tightly, and an open position, in which the second door is moved away from the second flange in order to gain access to the second enclosure through the second flange. The first and second flange are provided with second fastening means adapted to reversibly fasten the two flanges to each other and the first door and the second door are provided with third fastening means adapted to reversibly fasten the first and second doors to each other, so that, when assembling the first and second flanges to connect the first and second enclosures to each other by centering the first and second flanges on the central axis and by moving the first and second flanges relative to each other in rotation about the central axis, the second fastening means securely connect the first and second flanges to each other while, at the same time, the third fastening means securely connect the first door in the closed position and the second door in the closed position to each other and the first fastening means detach the first door in the closed position with respect to the first flange.

BRIEF DESCRIPTION OF THE DRAWINGS

The invention will be better understood upon reading the following description, given only by way of example and made with reference to the drawings in which.

DETAILED DESCRIPTION OF EMBODIMENTS

FIGS. 1 to 6 show a tight device 100 giving access to an enclosure E1. This tight device 100 is shown alone in FIGS. 1 and 2, whereas in FIGS. 3 to 6, it is associated with another tight device, referenced 200 and giving access to an enclosure E2 distinct from the enclosure E1. The tight device 100, which typically corresponds to a device of the "beta part" type mentioned above, and the tight device 200, which typically corresponds to a device of the "alpha part" type mentioned above, belong to a tight connection system between the enclosures E1 and E2.

As indicated in the introductory part of this document, the form of making each of the two enclosures E1 and E2 is not limiting: each of these enclosures can thus be a container, in particular a container, a room, a chamber, etc. Also, in FIGS. 1 to 6, these two enclosures are not shown, except on FIG. 2 for the enclosure E1 and on FIG. 4 for the enclosure E2, in which the enclosures are only indicated in dotted lines, in a partial and schematic way.

Figure 1:
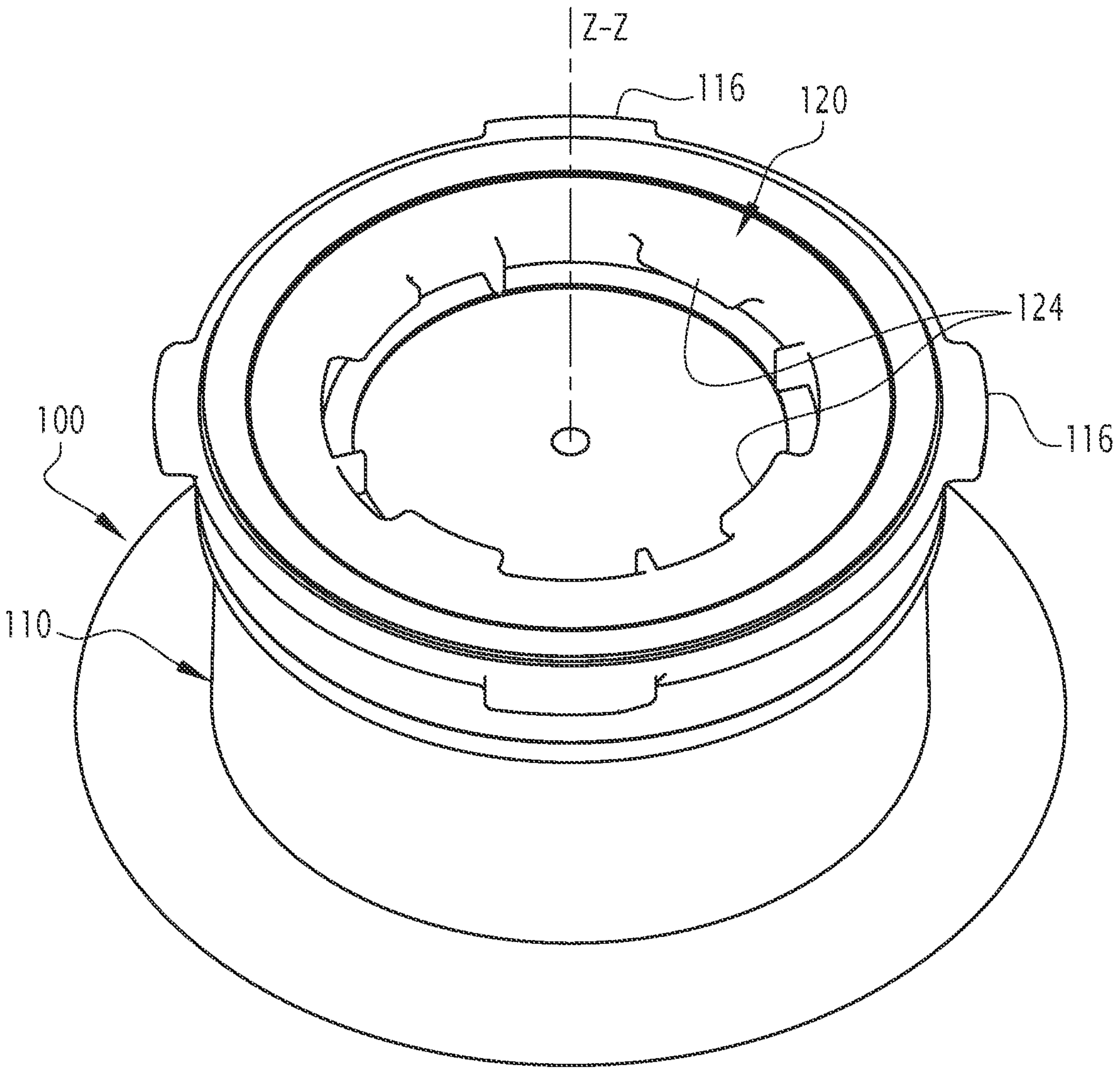
FIG. 1 is a perspective view of a tight device according to the invention.
Figure 2:
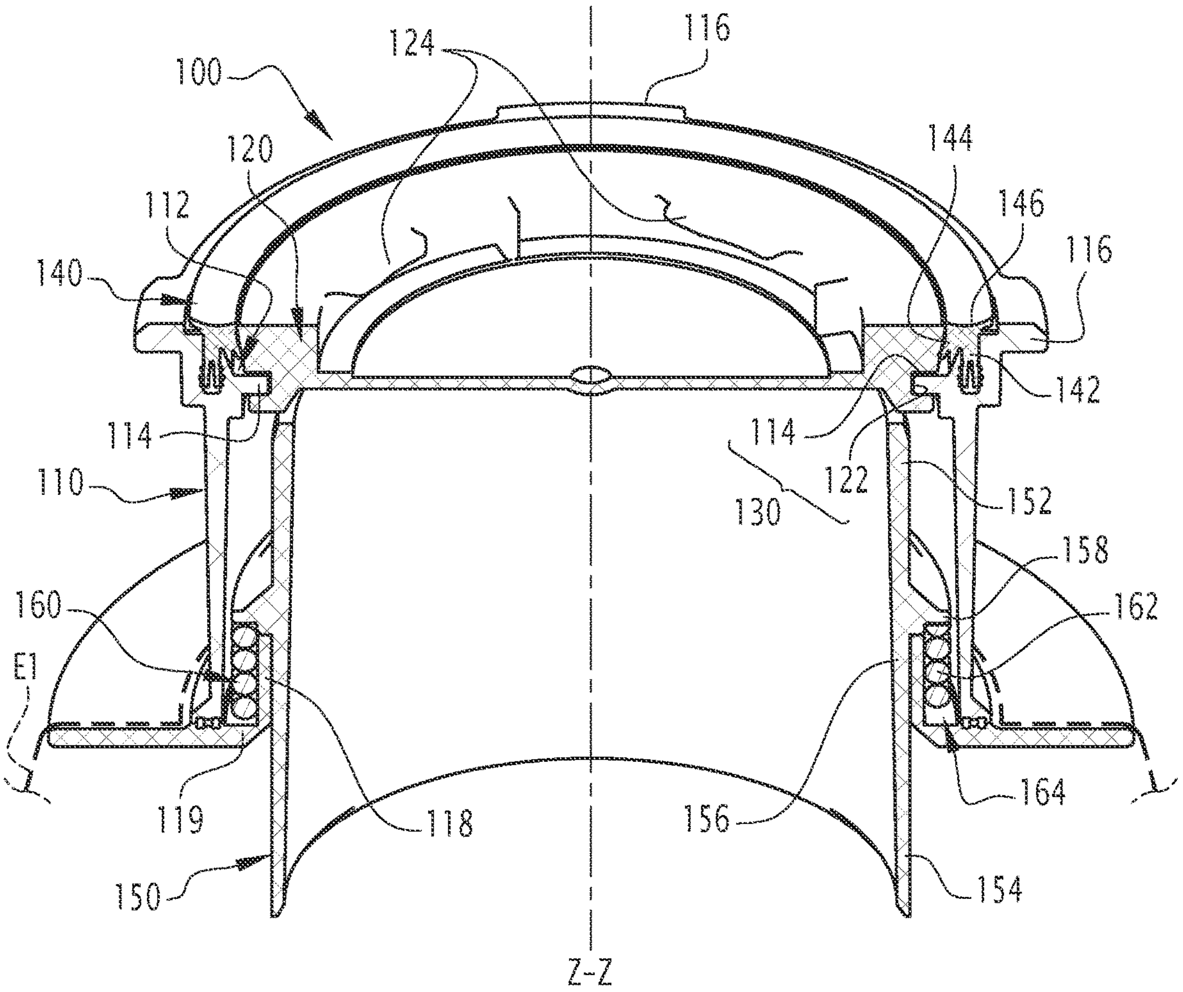
FIG. 2 is a view similar to FIG. 1, with a longitudinal section of the waterproof device.

As clearly visible in FIGS. 1 and 2, the tight device 100 comprises a flange 110.

The flange 110 defines a through opening 112 that has a closed contour. The flange 110 thus defines a central axis Z-Z on which the through opening 112 is centered. In the example embodiment considered in the figures, the through opening 112 is cylindrical with a circular base, centered on the Z-Z axis, it being noted that other geometric profiles are conceivable, as variants not shown.

Furthermore, the flange 110 is adapted to be attached tightly to the enclosure E1 so as to connect the inside and the outside of this enclosure via the through opening 112. In practice, a dedicated peripheral portion of the flange 110, facing away from the Z-Z axis, is attached tightly to a wall of the enclosure E1, through which the through opening 112 opens. The form of making tight connection between the flange 110 and the enclosure E1, as well as the geometrical specificities of the part of the flange, dedicated to this connection, are not limiting of the invention.

Also as clearly visible in FIGS. 1 and 2, the tight device 100 further comprises a door 120.

Figure 3:
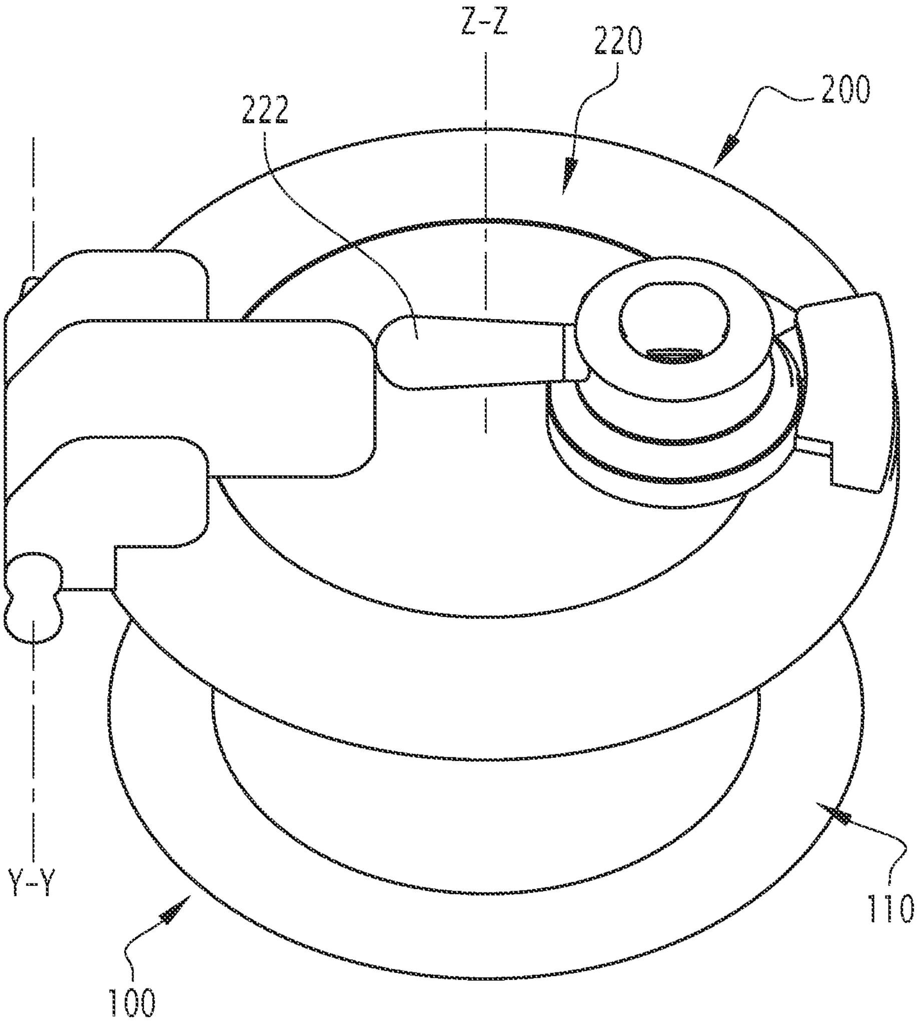
FIG. 3 is a perspective view of a waterproof connection system according to the invention, comprising the waterproof device of FIGS. 1 and 2.
Figure 4:
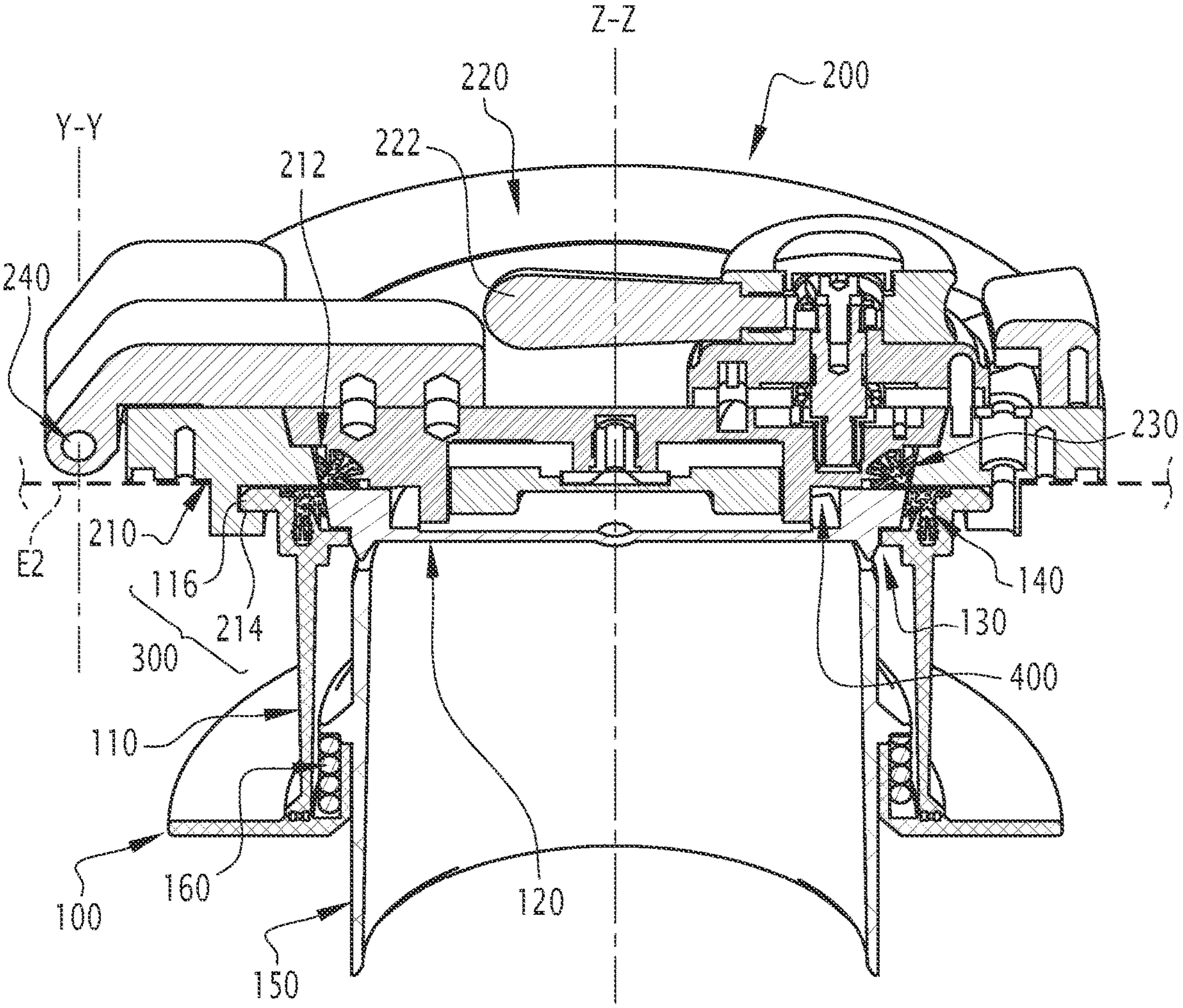
FIG. 4 is a view similar to FIG. 3, with a longitudinal section of the connection system.
Figure 5:
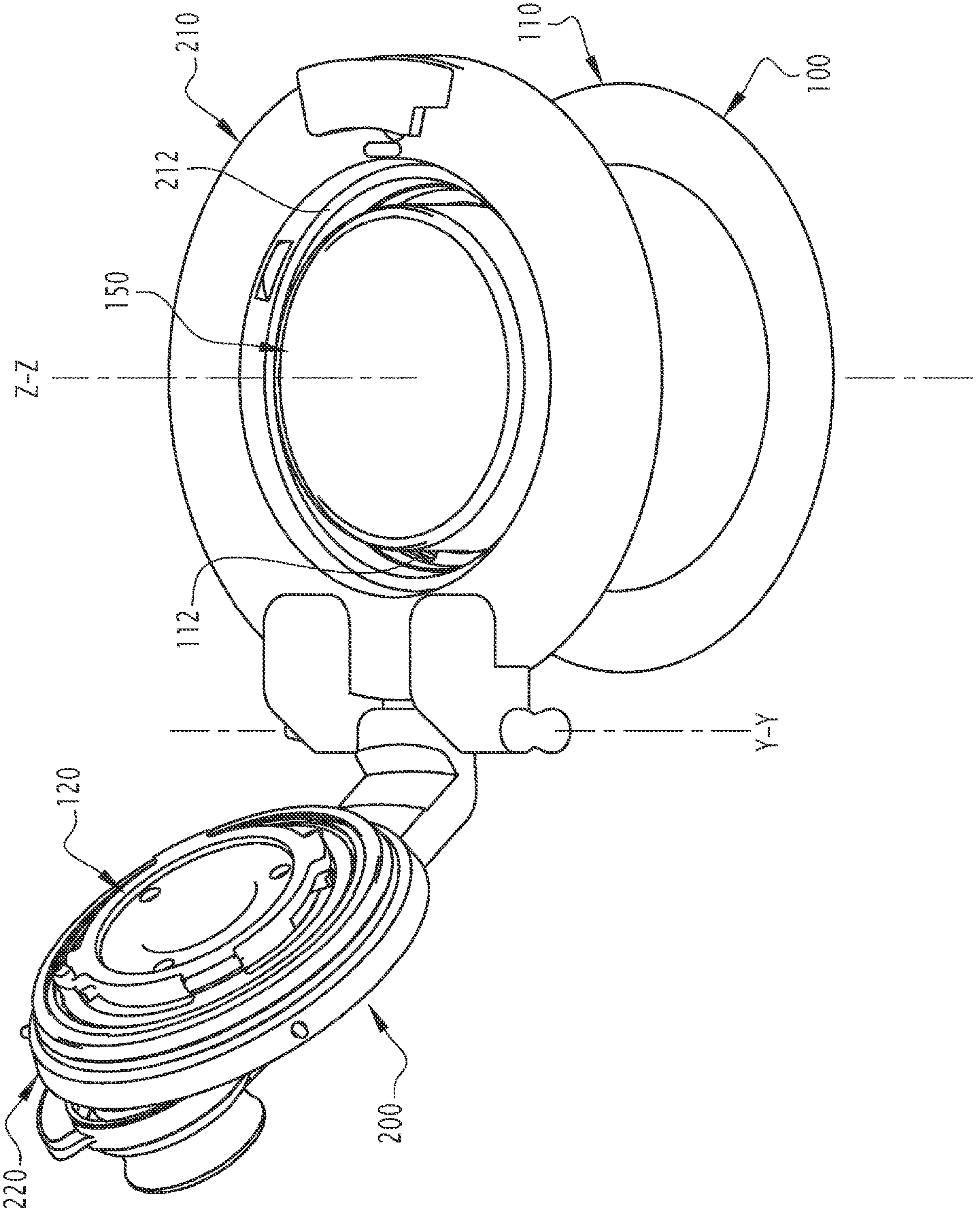
FIGS. 5 and 6 are views similar to FIGS. 3 and 4, respectively, illustrating the connection system in a different state of use than that illustrated in FIGS. 3 and 4.
Figure 6:
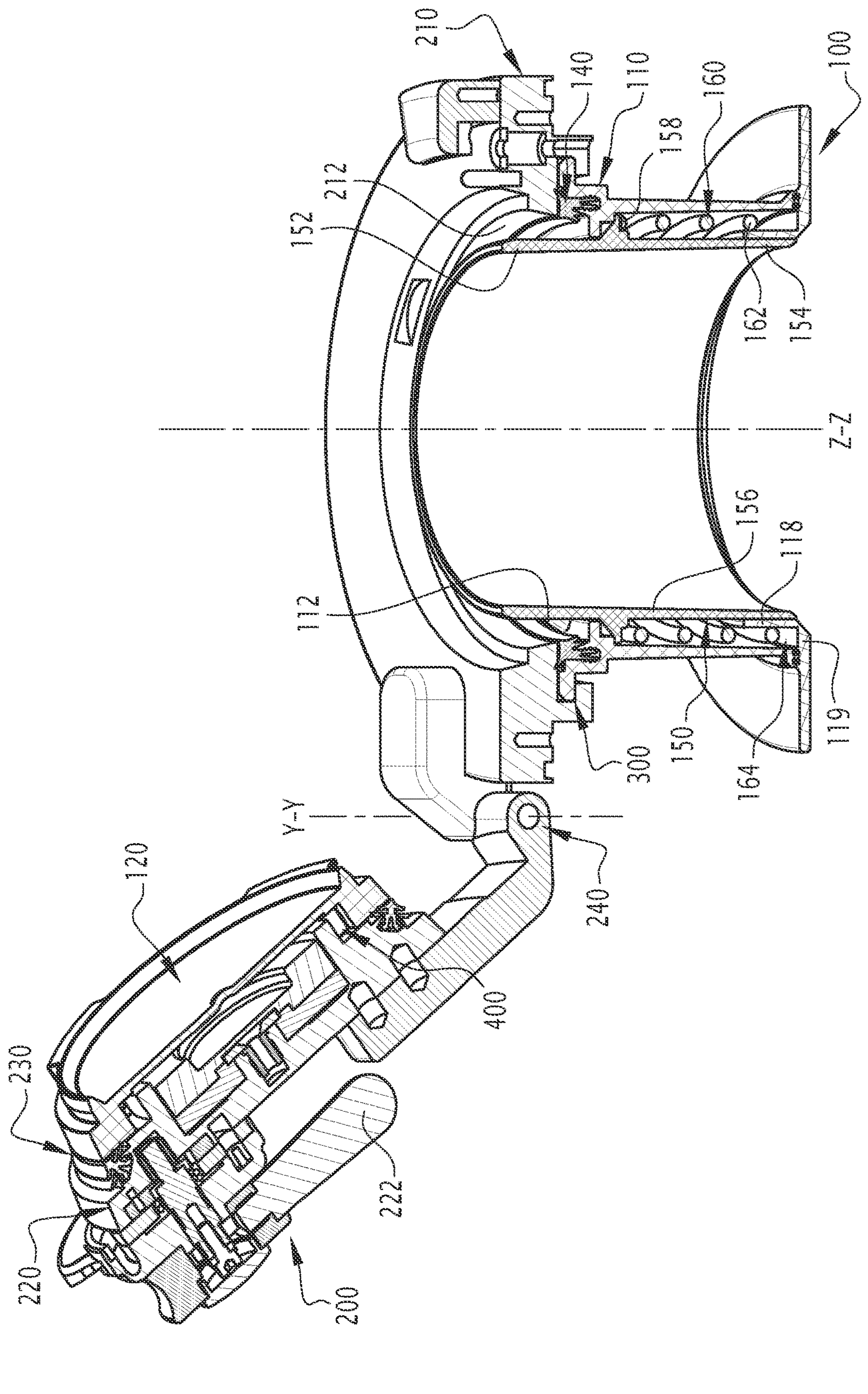

This door 120 is movable relative to the flange 110 between two distinct configurations, namely a closed configuration, illustrated by FIGS. 1 to 4, in which the door 120 closes the through opening 112 of the flange 110, and an open configuration, illustrated by FIGS. 5 and 6, in which the door 120 is clear of the through opening 112, here towards the outside of the enclosure E1, thus allowing access to the inside of the enclosure E1 from the outside of the enclosure E1 via the through opening 112.

The door 120 moves reversibly from one to the other, between the closed and open configurations, by moving away from the flange 110. In the example embodiment considered in the figures, this spacing is operable via the tight device 200, as explained in more detail below.

According to one practical embodiment implemented in the example shown in the figures, the door 120 in the closed configuration is mounted movably on the flange 110, in particular rotatably about the Z-Z axis, between a connected position, shown in FIGS. 1 and 2, in which the door 120 is fixedly connected to the flange 110, and a disconnected position, shown in FIGS. 3 and 4, in which the door 120 is detached from the flange 110 and thus movable to the open configuration. The movable connection between the door 120 and the flange 110, in particular the rotational connection about the Z-Z axis, allowing the door to move reversibly between the connected and disconnected positions, is made by an ad hoc fastening means 130. In the example considered here, these fixing means 130 are comprised of a bayonet fixing system, the complementary constituent parts of which are carried by the flange 110 and the door 120 respectively: thus, by way of example, this bayonet system includes, on the one hand, tabs 114, visible in FIGS. 2, 4 and 6, which project towards the Z-Z axis from the edge of the through opening 112 and distributed along the periphery of this edge, and, on the other hand, grooves 122, visible in FIG. 2, which are hollowed out towards the Z-Z axis from the outer periphery of the door 120 and distributed along this outer periphery so that, by centering the door 120 and the flange 110 on the Z-Z axis, each tab 114 is adapted to be engaged axially between two successive ones of the grooves 122, and then, by relative rotational movement about the Z-Z axis between the door and the flange, each tab 114 is adapted to be introduced orthoradially into one of the grooves 122, as in FIG. 2. More precise specifications of a non-limiting example of this bayonet system are given in EP 2091051, to which the reader may refer.

Whatever the specific features of the arrangements relating to the connection between the flange 110 and the door 120 that allow the latter to pass between the closed and open configurations, the flange 110 is fixedly provided with a gasket 140 which, in particular by virtue of its constituent material and its arrangement, fills the through opening 112 by the door 120 in the closed configuration. The embodiment of this gasket 140 is not limiting of the invention. In the example embodiment considered in the figures, this gasket 140 is a lip gasket, a base 142 of which is fixedly embedded in a peripheral groove of the flange 110 while at least one lip 144 of the gasket is arranged inside the through opening 112, bearing tightly against the outer periphery of the door 120 in the closed configuration, and at least one other lip 146 of the gasket extends outside the through opening 112 all around and flush with the door 120 in the closed configuration.

Before describing the remainder of the tight device 100, the tight device 200 and arrangements of the tight devices 100 and 200 that make it possible to assemble the latter in order to connect the enclosures E1 and E2 together, will be described in more detail.

As is clearly visible in FIGS. 3 to 6, the waterproof device 200 comprises a flange 210. Similar to the flange 110, the flange 210 defines a through opening 212 that has a closed contour. The flange 210 thus defines a central axis, on which the through opening 212 is centered and which, when the tight devices 100 and 200 are assembled together, is aligned with the Z-Z axis. The flange 210 is adapted to be attached tightly to the enclosure E2 so as to connect the interior and exterior of the enclosure via the through opening 212. The form of making the tight connection between the flange 210 and the enclosure E2, as well as the geometrical specificities of the part of the flange 210, dedicated to this connection, are not limiting of the invention.

Also, as clearly visible in FIGS. 3 to 6, the tight device 200 includes a door 220. This door 220 is movably mounted on the flange 210 between a closed position shown in FIGS. 3 and 4 in which the door 220 seals the through opening 212 tightly, and an open position shown in FIGS. 5 and 6 in which the door 220 is moved away from the flange 210 for access to the enclosure E2 via the through opening 212. The through opening 212 is closed tight by the door 210 in the closed position by any appropriate sealing means, interposed between the flange 210 and the door 220, such as a gasket 230 that is arranged here attached to the door 220.

In the example embodiment considered in the figures, the door 220 is advantageously movable between its closed and open positions by tilting about an axis Y-Y that extends in a direction orthoradial to the central axis of the flange 210. The tilting connection between the door 220 and the flange 210 is achieved by a hinge mechanism 240, for example, which defines the tilting axis Y-Y and whose two constituent parts, movable relative to each other, are carried by the flange 210 and the door 220 respectively. In order to facilitate the movement of the door 220 between its closed and open positions, this door is equipped with an operating handle 222 for example.

In order to be able to assemble the tight devices 100 and 200 to each other and thus connect the enclosures E1 and E2 to each other, the flanges 110 and 210 are provided with fastening means 300 for reversibly fastening the flanges to each other, and the doors 120 and 220 are provided with fastening means 400 for reversibly fastening the doors to each other. By means of a single rotary maneuver between the flanges 110 and 120, these fastening means 300 and 400 are designed to both securely assemble these two flanges to each other and to securely assemble the doors 120 and 220 to each other, while passing the door 120 in a disconnected position with respect to the flange 110, in other words, while detaching the door 120 from the flange 110. In other words, when assembling the flanges 110 and 210 to connect the enclosures E1 and E2 to each other by centering these flanges on the Z-Z axis and then by relative movement in rotation about this Z-Z axis, the fastening means 300 fixedly connect the flanges 110 and 210 to each other while, at the same time, the fastening means 400 fixedly connect the door 120 in the closed configuration and the door 220 in the closed position to each other on the one hand and, on the other hand, the fastening means 130 release the door 120 in the closed configuration from the flange 110 by moving the door 120 from its connected position to its disconnected position with respect to the flange 110.

In the example embodiment considered in the figures, the fastening means 300 are made in the form of a bayonet system, the complementary constituent parts of which are carried by the flange 110 and the flange 210 respectively: this bayonet system comprises lugs 116 on the one hand, visible in FIGS. 1, 2, 4 and 6, which project in the opposite direction to the Z-Z axis from the outer periphery of the flange 110 and are distributed along this outer periphery of the flange 110, and grooves 214 on the other hand, visible in FIGS. 4 and 6, which are hollowed out in the opposite direction of the Z-Z axis from the edge of the through opening 212 and are distributed along the periphery of this edge, so that, by centering the flanges 110 and 210 on the Z-Z axis and then by rotational movement about this Z-Z axis, each tab 116 is designed to be engaged axially between two successive grooves 214 and then to be introduced orthoradially into one of these grooves, as shown in FIGS. 4 and 6. More precise specifications of a non-limiting example of this bayonet system are given in EP 2091051, to which the reader may refer.

Likewise, in the example embodiment considered in the figures, the fastening means 400 are made in the form of a bayonet system, the complementary constituent parts of which are carried by the doors 120 and 220 respectively: this bayonet system comprises lugs 124 on the one hand, visible in FIGS. 1 and 2, which project towards the Z-Z axis from the inner periphery of a peripheral edge of the door 120 and are distributed along this inner periphery of this edge of the door 120, and grooves on the other hand, not visible in the figures, which are hollowed out towards the Z-Z axis from the outer periphery of a peripheral edge of the door 220 received coaxially inside the aforementioned flange of the door 120, and are distributed along the outer periphery of this flange of the door 220, so that, by centering the doors 120 and 220 on the Z-Z axis and then by relative rotational movement about this axis, each tab 124 is engaged axially between two of the aforementioned grooves, which follow one another, and then introduced orthoradially into one of these aforementioned grooves. More precise specifications of a non-limiting example of this bayonet system are given in EP 2091051, to which the reader may refer.

Of course, as usual for any bayonet system, each of the grooves 122 of the door 120, the grooves 214 of the flange 210 and the aforementioned grooves of the door 220, at its peripheral end opposite that through which one of the corresponding tabs 114, 116 and 124 is intended to be inserted, is closed by any suitable fixed element, against which the aforementioned tab abuts when the latter is inserted at the maximum in the groove, i.e. when the maximum rotation between the groove and the tab is achieved. More generally, it is understood that the rotary assembly stroke by the fastening means 300 between the flanges 110 and 210, which is typically 30° to 60°, corresponds to the accumulation of the rotary stroke between the doors 120 and 220, to assemble them to each other by the fastening means 400, and of the rotary stroke between the door 120 and the flange 110, to disconnect them from each other by neutralizing the fastening means 130.

Returning now to the description of the tight device 100, the arrangements of this tight device 100 that make it possible to limit potential pollution coming from the gasket 140 are next of interest. To this end, the tight device 100 includes a tubular member 150, visible in FIGS. 2 and 4 to 6, and an elastic member 160, visible in FIGS. 2, 4 and 6.

The tubular member 150 is movably mounted on the flange 110 between two extreme positions, namely a retracted position occupied by the tubular member 150 when the door 120 is in a closed configuration and thus illustrated in FIGS. 1 to 4, and a deployed position occupied by the tubular member 150 when the door 120 is in an open configuration and thus illustrated in FIGS. 5 and 6.

In its retracted position, the tubular member 150 is arranged outside the through opening 112 and thus does not prevent the door 120 from being in the closed configuration, in particular without the tubular member 150 interfering with the fastening means 130. In practice, the tubular member 150 is located on one of the two axial sides of the door 120, such that the tubular member 150 does not interfere with the separation of the door 120 from the flange 110 in order to pass this door in an open configuration. In the embodiment considered in the figures, the tubular member 150 is thus located on the side of the door 120, facing the interior of the enclosure E1.

In its deployed position, the tubular member 150 is arranged in the through opening 112 so as to cover the gasket 140, i.e., so that the gasket 140 and the outer lateral surface of the tubular member 150 face each other in a direction radial to the Z-Z axis, as clearly visible in FIGS. 5 and 6. In practice, the tubular member 150 does not have to come to rest against the gasket 140 for the latter to be considered covered by the tubular member 150 within the meaning of the invention: as clearly visible in FIG. 6, the gasket 140 and the tubular member 150 may be distant from each other radially to the Z-Z axis. In any case, the tubular member 150 forms a physical separation between the gasket 140 and the internal volume of the tubular member 150, it being noted that this internal volume of the tubular member 150 connects the inside and the outside of the enclosure E1, opening freely out of the tubular member at the level of the two opposite longitudinal ends 152 and 154 of the tubular member 150, which are open.

According to one advantageous arrangement implemented in the example embodiment considered in the figures, which makes it possible for the tubular member 150 to cover the gasket 140 in a particularly satisfactory manner, the gasket 140 is arranged all around the tubular member 150 and the latter extends lengthwise on either side of the gasket 140. That is, the gasket 140 surrounds an intermediate longitudinal portion 156 of the tubular member 150, located between its longitudinal ends 152 and 154.

According to one practical arrangement implemented in the example embodiment considered in the figures, the tubular member 150 is, coaxial to the Z-Z axis, at least partially or even totally. The tubular member 150 and the through opening 112 are thus aligned, which advantageously can make it possible, inter alia, to simplify the mounting of the tubular member 150 on the flange 110 as well as maximize the internal volume of the tubular member 150 by providing that its external lateral surface is complementary to the through opening 112.

According to another practical arrangement also implemented in the example considered here and advantageously associated with the preceding arrangement, the tubular member 150 is movable between its retracted and deployed positions by translation along the Z-Z axis, in particular by rectilinear translation. The kinematics of moving the tubular member 150 is thus simple and efficient. Advantageously, the translational movement of the tubular member 150 is guided by sliding contact between the tubular member and the flange 110. More specifically, the outer lateral surface of the tubular member 150 is advantageously provided complementary to both the edge of the through opening 12 and a dedicated bearing surface 118 of the flange 110: when the tubular member 150 is in a retracted position, the bearing surface 118 surrounds the intermediate longitudinal portion 156 of the tubular member 150 while the longitudinal end 152 of the tubular member 150, facing the through opening 112, is outside the latter, in particular being distant from the edge of the through opening 112, as clearly visible in FIGS. 2 and 4; when the tubular member 150 is in the deployed position, the bearing surface 118 surrounds the longitudinal end 154 of the tubular member 150 and the edge of the through opening 112 surrounds the intermediate longitudinal portion 156 of the tubular member, as clearly visible in FIG. 6. It is understood that when the tubular member 150 moves from its retracted position to its deployed position, the bearing surface 118 is maintained in sliding contact against the outer lateral surface of the tubular member 150, while the edge of the through opening 112 first receives the longitudinal end 152 of the tubular member 150, which is moreover advantageously beveled for this purpose, and is then progressively applied in sliding contact against this longitudinal end 152 and the longitudinal portion 156 of the tubular member 150.

The elastic member 160, within the tight device 100, is arranged to drive the tubular member 150 from its retracted position to its deployed position when the door 120 is in an open configuration. When the door 120 is in the closed configuration, the elastic member 160 is in a deformed state and thus stores elastic energy. When the door 120 is in an open configuration, the elastic member 160 releases this elastic energy to push the tubular member 150 from its retracted position to its deployed position. Of course, it is understood that in order to move the tubular member 150 from its deployed position to its retracted position, sufficient force must be applied to force the elastic member 160 back to its aforementioned deformed state. In practice, the elastic member 160 is sized so that the aforementioned force is sufficiently small so as not to interfere with the use of the tight device 100, while ensuring that the elastic member 160 produces sufficient elastic energy to drive the tubular member 150 from its retracted position to its deployed position in an efficient and reliable manner.

In one advantageous practical arrangement implemented in the example embodiment considered in the figures, the tubular member 150 in the retracted position is pressed by the elastic member 160 against the door 120 in the closed configuration so as to be driven to the deployed position by the elastic member at the same time as the door 120 is moved to the open configuration. In this manner, as soon as the door 120 is moved from its closed configuration to its open configuration, the tubular member 150 automatically moves from its retracted position to its deployed position.

In one practical and economical embodiment, the elastic member 160 comprises a coil spring 162 arranged around the tubular member 150, which is interposed, along the Z-Z axis, between a collar 158 of the tubular member 150, provided protruding from the outer lateral surface of this tubular member, and a rim 119 of the flange 110, facing towards the Z-Z axis from the rest of the flange 110.

According to one advantageous arrangement implemented in the example embodiment considered in the figures, the elastic member 160 is integrally arranged in a housing 164 that is jointly delimited by the flange 110 and the tubular member 150. This housing 164 has a generally annular shape, for example, which is interposed between the tubular member 150 and a corresponding tubular portion of the flange 110 and which is adapted to the helical spring 162. The housing 164 is intended to remain closed as the tubular member 150 moves between its retracted and deployed positions. In other words, the housing 164 is closed regardless of the position of the tubular member 150 between the retracted and deployed positions, so that the elastic member 160 remains confined therein. In this way, regardless of the position of the tubular member 150, the elastic member 160 is physically separated from the interior of the enclosure E1 and the internal volume of the tubular member 150.

Regardless of the specificities of the tubular member 150 and the elastic member 160, potential pollution from the gasket 140 is avoided. Such potential pollution may be associated with the fact that part of the gasket 140 is in contact with the air, as long as the tight device 100 is not assembled to the tight device 200 or to a similar tight device, and is therefore likely to secure particles present in the air. In the example embodiment considered in the figures, the lip(s) 146 of the gasket 140, as well as the transition area between the lip(s) 146 and the lip(s) 144 of the gasket 140, are thus exposed to the air prior to assembly of the tight device 100 with the tight device 200, as clearly visible in FIGS. 1 and 2. Once the tight devices 100 and 200 are assembled to each other and the doors 120 and 220 are open as in FIG. 6, the particles present in the gasket 140, such as those present in the transition zone between the lip(s) 144 and the lip(s) 146, are not likely to be driven by products or materials transferred via the through opening 112, thanks to the tubular member 150 in the deployed position: indeed, products or materials transferred either from the inside of the enclosure E1 to the outside of the latter, in particular into the enclosure E2 when the tight devices 100 and 200 are connected, or from the outside of the enclosure E1 to the inside of the latter, in particular from the enclosure E2 when the tight devices 100 and 200 are connected, transit through the inside of the tubular member 150, without touching the gasket 140 and thus limiting the risk of being polluted thereby. Similarly, any wear of the gasket 140 resulting from the repeated rubbing of the aforementioned products or materials against the gasket during the transfer thereof is avoided, which prevents any pollution by gasket micro-fragments which over time would be removed from the gasket 140.

Various arrangements and variants of the tight device 100, as well as of the tight connection system comprising this tight device 100 and the tight device 200, are conceivable. By way of example:

- the constituent structure of the flanges 110 and 210 is not limiting of the invention, so that each of these flanges can be made of a single piece or be constituted of several pieces assembled to each other rigidly, the constituent material of this or these pieces also not being limiting; Thus, in the example embodiment considered in the figures, the flange 110 comprises two distinct parts, assembled to each other rigidly, namely a first part, which is turned away from the enclosure E1 and which, inter alia, delimits the through opening 112, and a second part, which is turned towards the enclosure E1 and which includes, inter alia, the dedicated bearing surface 118 and the rim 119; and/or the tight device 100 can be used with the Z-Z axis vertical or horizontal; and/or the embodiment of the various bayonet systems described above is not limiting; more generally, other reversible fastening systems may be contemplated for the fastening means 130, 300 and/or 400.

The invention claimed is:

1. A tight device giving access to an enclosure, comprising:

a flange, which delimits a through opening, defining a central axis, and which is adapted to be tightly attached to the enclosure so as to connect interior and exterior of the enclosure via the through opening;

a door that is movable relative to said flange between a closed configuration, in which the door closes the through opening, and an open configuration, in which the door is clear of the through opening;

a gasket, which is attached to said flange and which seals closing of the through opening by said door in the closed configuration;

a tubular member, movably mounted on said flange between a retracted position in which the tubular member is arranged outside the through opening, the retracted position being occupied by the tubular member when said door is in the closed configuration, and a deployed position in which the tubular member is arranged in the through opening so as to cover and physically protect said gasket, the deployed position being occupied by the tubular member when said door is in the open configuration; and an elastic member, adapted to drive said tubular member from the retracted position to the deployed position when said door is in the open configuration.

2. The tight device according to claim 1, wherein when said tubular member is in the deployed position, said gasket is arranged all around said tubular member and said tubular member extends lengthwise on either side of said gasket.

3. The tight device according to claim 1, wherein said tubular member in the retracted position is pressed by said elastic member against said door in the closed configuration so as to be driven towards the deployed position by said elastic member at the same time as said door is moved towards the open configuration.

4. The tight device according to claim 1, wherein said tubular member is coaxial with the central axis.

5. The tight device according to claim 1, wherein said tubular member is movable between the retracted and the deployed position by translation along the central axis.

6. The tight device according to claim 5, wherein said tubular member is guided in translation by complementarity of shapes between an outer lateral surface of said tubular member and both an edge of the through opening and a dedicated bearing surface of said flange.

7. The tight device according to claim 1, wherein said elastic member comprises a helical spring arranged around said tubular member and interposed, along the central axis, between a collar of said tubular member and a rim of said flange.

8. The tight device according to claim 1, wherein said flange and said tubular member jointly define a housing, in which said elastic member is integrally arranged and which remains closed when said tubular member passes between the retracted and the deployed positions position.

9. The tight device according to claim 1, wherein said gasket is a lip gasket comprising:

a base that is fixedly embedded in a peripheral groove of the flange;

at least one first lip that is arranged inside the through opening, bearing tightly against an outer periphery of the door in the closed configuration; and at least one second lip that extends outside the through opening, being arranged all around and flush with the door in the closed configuration.

10. A system for tightly connecting two enclosures, comprising:

a first tight device giving access to a first enclosure of the two enclosures, the first tight device comprising:

a first flange, which delimits a through opening, defining a central axis, and which is adapted to be tightly attached to the first enclosure so as to connect interior and exterior of the first enclosure via the through opening;

a first door that is movable relative to said first flange between a closed configuration, in which the first door closes the through opening, and an open configuration, in which the first door is clear of the through opening, a gasket, which is attached to said first flange and which seals closing of the through opening by said first door in the closed configuration;

a tubular member, movably mounted on said first flange between:

a retracted position in which the tubular member is arranged outside the through opening, the retracted position being occupied by the tubular member when said first door is in the closed configuration, and a deployed position in which the tubular member is arranged in the through opening so as to cover said gasket, the deployed position being occupied by the tubular member when said first door is in the open configuration; and an elastic member, adapted to drive said tubular member from the retracted position to the deployed position when said first door is in the open configuration, wherein said first flange and said first door are provided with first fastening means adapted to fasten said first flange and said first door together in a reversible manner in a closed configuration; and a second tight device giving access to a second enclosure of the two enclosures, comprising:

a second flange, which is adapted to be tightly attached to the second enclosure so as to access interior of the second enclosure through the second flange; and a second door, carried by said second flange movably between a closed position, in which the second door tightly seals said second flange, and an open position, in which the second door is moved away from said second flange to access the second enclosure through said second flange, wherein (i) said first flange and said second flange are provided with second fastening means, adapted to reversibly fasten said first flange and said second flange to each other, and (ii) said first door and said second door are provided with third fastening means adapted to reversibly fasten said first door and said second door to each other, so that, when assembling said first flange and said second flange to connect the first and second enclosures by centering said first flange and said second flange on the central axis and by moving said first flange and said second flange relative to each other in rotation about the central axis, the second fastening means fixedly connects said first flange and said second flange to each other while, at the same time, the third fastening means fixedly connects said first door in the closed position and said second door in the closed configuration to each other and the first fastening means detaches said first door in the closed configuration from said first flange.

11. The system according to claim 10, wherein said second door is carried by said second flange in a tiltable manner about a tilt axis that is orthoradial to a central axis of said second flange.

12. The system according to claim 10, wherein when said tubular member is in the deployed position, said gasket is arranged all around said tubular member, and said tubular member extends lengthwise on either side of said gasket.

13. The system according to claim 10, wherein said tubular member in the retracted position is pressed by said elastic member against said first door in the closed configuration so as to be driven towards the deployed position by said elastic member at the same time as said first door is moved towards the open configuration.

14. The system according to claim 10, wherein said tubular member is coaxial with the central axis.

15. The system according to claim 14, wherein said tubular member is guided in translation by complementarity of shapes between an outer lateral surface of said tubular member and both an edge of the through opening and a dedicated bearing surface of said first flange.

16. The system according to claim 10, wherein said tubular member is movable between the retracted and the deployed position by translation along the central axis.

17. The system according to claim 10, wherein said elastic member comprises a helical spring, arranged around said tubular member and interposed, along the central axis, between a collar of said tubular member and a rim of said first flange.

18. The system according to claim 10, wherein said first flange and said tubular member jointly define a housing, in which said elastic member is integrally arranged and which remains closed when said tubular member passes between the retracted and the deployed positions position.

19. The system according to claim 10, wherein said gasket is a lip gasket comprising:

a base that is fixedly embedded in a peripheral groove of the first flange;

at least one first lip that is arranged inside the through opening, bearing tightly against an outer periphery of the first door in the closed configuration; and at least one second lip that extends outside the through opening, being arranged all around and flush with the first door in the closed configuration.

* * * * *